United States Patent Office 3,530,159
Patented Sept. 22, 1970

3,530,159
ORGANOSILICON POLYMERS CONTAINING OXYALKYLENE RESIDUES
Paul Alfred Eugene Guinet and Jean Marius Ernest Morel, Lyon, France, assignors to Rhone-Poulenc S.A., Paris, France, a corporation of France
No Drawing. Filed July 15, 1965, Ser. No. 472,358
Claims priority, application France, July 22, 1964, 982,648
Int. Cl. C07f 7/08
U.S. Cl. 260—448.2
3 Claims

ABSTRACT OF THE DISCLOSURE

The invention provides polysiloxanes containing two oxyalkylene residues attached to each terminal silicon atom, which are useful as surface active agents in the production of polyurethane foams.

---

This invention relates to the preparation of organopolysiloxane compounds.

It has already been proposed to condense polyalkylene-glycol ethers with various polysiloxanes, the reaction generally being carried out in the presence of strongly acid or basic catalysts. One of the first processes employed was the condensation of a polyalkoxypolysiloxane with a polyalkylene-glycol monoether in a solvent medium and in the presence of a catalyst such as trifluoroacetic acid. The first polyalkoxypolysiloxanes employed were themselves obtained by the rearrangement of an organotrialkoxysilane with a diorganopolysiloxane in the presence of an alkaline catalyst, which gave branched polymers consisting of polysiloxane chains attached to a common silicon atoms. The subsequent condensation with polyalkylene-glycol did not modify the structure of the product, because this glycol caused a lengthening of the various polysiloxane chains.

It has also been proposed to make compounds possessing siloxane and polyoxyalkylene units in which the silicon atoms are attached to the polyoxyalkylene chains by Si—C bonds. These compounds were obtained from linear organopolysiloxanes possessing silicon-hydrogen bonds, and polyalkylene-glycol ethers having a double bond at one end of the chain. This second type of compound possesses similar properties to those of the first as regards surface-active activity and lubricating effect. On the other hand, they behave rather differently on hydrolysis.

Regardless of the type of polysiloxane-polyoxyalkylene compound, the preparative processes hitherto employed have not given readily reproducible products of well defined formula. In particular, in the case of products of the second type having silicon-carbon bonds, the organopolysiloxanes, used to react with the polyalkylene-glycols having ethylenic double bonds, have been obtained by re-arrangement of various types of siloxanes, for example by rearrangement of siloxanes of the formulae: $R_3SiO_{0.5}$, $R_2SiO$ and $RSiH(O)$ (in which R represents a halogenated or non-halogenated monovalent hydrocarbon radical), which gives mixtures of variable composition depending on the conditions of the rearrangement.

Another process for the preparation of siloxanes employed to prepare block copolymers consists in cohydrolysing organochlorosilanes, such as dimethyldichlorosilane and dimethylmonochlorosilane, and balancing the products of hydrolysis with a catalyst such as sulphuric acid. Here again, the organopolysiloxanes obtained consist of chains of very variable length depending upon the conditions of the hydrolysis. Thus, when organohydrogenopolysiloxanes of the above types are reacted with polyalkylene-glycols possessing a double bond, copolymers are obtained which consist of molecules of very different natures, the polyoxyalkylene units of which are irregularly distributed along the siloxane chains.

The present invention provides siloxane-polyoxyalkylene copolymers which are free from silicic ester bonds (Si—O—C), which possess a well defined structure in which the polyoxyalkylene units are attached to silicon atoms by carbon-silicon bonds in clearly determined positions.

The present invention also provides a process for the preparation of these new compounds.

It has been found that if a linear diorganopolysiloxane, the chain ends of which are terminated by dihydrogeno-mono-organosilyl radicals, is reacted with a mono- or polyalkylene-glycol diether, one of the etherifying radicals containing a —CH=CH$_2$ group, in the presence of a platinum catalyst, four molecules of mono- or polyalkylene-glycol diether are attached to one molecule of the diorganopolysiloxane, and there is obtained an addition product of regular structure which possesses in a high degree the characteristic properties of siloxane-polyoxyalkylene copolymers.

The new compounds produced in accordance with this invention have the formula:

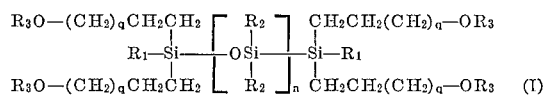 (I)

in which each of the radicals $R_1$ and $R_2$ is lower alkyl, cycloalkyl of 5 or 6 ring carbon atoms, phenyl, (lower alkyl) phenyl, or phenyl (lower alkyl), $n$ is an integer from 2 to 700, $q$ is an integer from 0 to 3, and each radical $R_3O$ is of the formula:

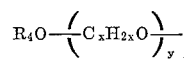

in which $R_4$ is lower alkyl, $x$ is 2, 3 or 4, and $y$ is a positive integer, the various radicals ($C_xH_{2x}O$) being the same or different.

As already stated, they are produced by reacting (a) a linear organopolysiloxane in which the two terminal silicon atoms are each directly bound to two hydrogen atoms with (b) the diether of a glycol containing an unsaturated alcohol residue having a —CH=CH$_2$ group, in the presence of a platinum catalyst.

The reaction may be written as follows:

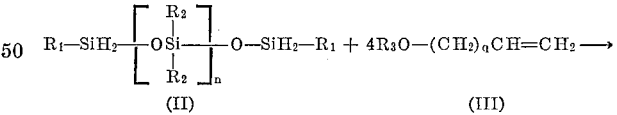

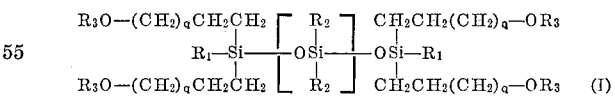 (I)

As used herein the term "lower alkyl" means alkyl of 1 to 4 carbon atoms. Thus $R_1$ and $R_2$ may be more especially alkyl of 1 to 4 carbon atoms; mononuclear cycloalkyl radicals of 5 or 6 ring carbon atoms such as cyclopentyl, cyclohexyl, and the corresponding alkyl-cycloalkyl radicals; phenyl; (lower alkyl)phenyl such as tolyl, xylyl or cumenyl; or phenyl (lower alkyl) such as benzyl or phenylethyl. The various $R_1$ radicals of a single molecule may be identical or different; and likewise, the radicals —$R_2$ may be identical or different. Preferably $R_1$ and $R_2$ are both methyl. $C_xH_{2x}$— is generally —CH$_2$—CH$_2$— or —CH$_2$—CH(CH$_3$), $R_4$ is preferably butyl, $q$ is preferably 1 and $n$ is preferably 2 to 50.

The compounds of Formula I may be prepared from homopolymers of Formula II, mixtures of homopolymers of Formula II, or copolymers of Formula II. Likewise, the alkylene glycol diethers of the Formula III employed may be mixtures in which the molecules have different values of $y$, and the other symbols have different meanings. However, in general $y$ will have an average value more than 1, and the use of monoalkylene-glycol diethers makes it possible to obtain compounds having various viscosities without the surface-active properties of the compounds being affected. When a monoalkylene-glycol diether is used, it is employed preferably in a proportion of 0.1 to 0.5 mol per mol of polyalkylene-glycol diether employed.

The reaction between the tetrahydrogenated organopolysiloxane and the alkylene-glycol diether, is carried out in the presence of a platinum-based catalyst, such as finely divided platinum on a support such as asbestos, alumina, charcoal or silica. The platinum compound may be chloroplatinic acid or a platinum-olefin complex, the former being preferred. The quantity of catalyst employed may vary within wide limits, but is generally small, so that it is unnecessary to separate it at the end of the operation. It is thus possible to use quantities of the order of 0.5 mg. of platinum for each equivalent of SiH bond present in the molecule of the silicon compound employed.

The reaction is preferably carried out at temperatures between 50° and 200° C., preferably in a diluent having a reflux temperature in this temperature range, so that the reaction temperature can conveniently be fixed. The diluent and the catalyst may be readily separated at the end of the reaction by application of known means such as filtration and distillation.

The new compounds of the invention have excellent stability to water, which is explained by the absence of Si—O—C bonds in their molecules, and by a particularly high surface-active power in the preparation of foamed polyurethanes by the reaction of organic polyisocyanates with polyols. The properties naturally vary with the nature of the organic radicals, and the values of $y$ and $n$. The viscosity of the compounds may range from 20 to $10^6$ centistokes at 25° C. For use as surface-active agents in the preparation of foamed polyurethanes, compounds are preferably employed whose viscosity is between 500 and 5000 centistokes at 25° C.

The dihydrogenomono - organosilyl - terminated diorganopolysiloxanes employed in the preparation of the compounds of the invention may be obtained by the action of a linear $\alpha,\omega$-dihydroxydiorganopolysiloxane on a hydrolysable dihydrogenosilane containing a group —SiH$_2$X, e.g. of the formula R$_1$SiH$_2$X, in which R$_1$ is as hereinbefore defined and X is a monovalent hydrolysable atom or group such that HX is an acid or basic compound. Preferred compounds of formula R$_1$SiH$_2$X are the organochlorosilane R$_1$SiH$_2$Cl, which may be prepared, for example, by disproportionation, in the presence of catalysts, of dichloromonohydrogenomonoalkylsilanes produced by the action of alkyl chlorides on silicon.

When X represents a halogen atom or an acyl radical, the condensation of R$_1$SiH$_2$X with the $\alpha,\omega$-dihydroxydiorganopolysiloxane is carried out in the presence of an agent capable of neutralising the compounds HX formed. For this purpose, a tertiary amine is preferably employed.

The reaction of the compound R$_1$SiH$_2$X on the $\alpha,\omega$-dihydroxy linear diorganopolysiloxane is advantageously carried out in a diluent which is inert under the operating conditions (e.g. benzene, toluene, xylene, monochlorobenzene, petroleum ether, or an aliphatic ether such as diethyl, dipropyl or dibutyl ether).

The preparation of the tetrahydrogenopolysiloxanes may be carried out at ambient temperature (20° C.) or with heating or cooling, at least at the beginning of the operation, account being taken more particularly of the volatility of the compounds R$_1$SiH$_2$X employed.

The alkylene-glycol ethers containing an alkenyl radical have already been described in the literature. They can be readily prepared from an alkylene-glycol monoether, for example, by the action of sodium and then of an alkenyl chloride.

The following examples illustrate the invention.

EXAMPLE 1

Into a 250 cc. round-bottomed flask provided with a mechanical stirrer and a reflux condenser are introduced 34 g. of the polyethylene-polyisopropylene-glycol diether of the average formula:

$$C_4H_9O(C_2H_4O)_{39.1}(C_3H_6O)_{30.1}CH_2CH=CH_2$$

(containing 0.75% of double bond), and 3 g. of a tetrahydrogenopolysiloxane of the average formula:

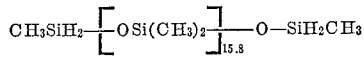

are then added. The mixture is diluted with 50 g. of toluene, and 0.5 g. of a 1% solution of chloroplatinic acid in isopropanol is added as catalyst. The mixture is heated at the reflux temperature of the toluene. After 6 hours, it is confirmed, by checking the absence of Si—H linkages in the medium, that the additional reaction is complete. After cooling, the reaction product is filtered and the toluene driven off under 100 mm. Hg. 29 g. of a slightly yellow clear oil are obtained. This oil, which has a viscosity of 995 centistokes at 20° C., is water-soluble and may be employed in the preparation of a polyurethane foam.

The polyethylene-polypropylene-glycol diether employed as starting material may be obtained simply by the action of allyl chloride on the sodium derivative of the monoether of the average formula:

$$C_4H_9O(C_2H_4O)_{39.1}—(C_3H_6O)_{30.1}H.$$

The tetrahydrogenopolysiloxane starting material may be obtained by the action of a solution of 0.41 g. of CH$_3$SiH$_2$Cl in diethyl ether on a solution of 3 g. of a compound of the average formula:

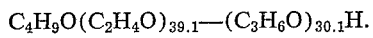

in diethyl ether in the presence of 0.4 g. of triethylamine.

EXAMPLE 2

30 g. of a alkylene-glycol diether (prepared by a procedure similar to that described in Example 1) and of the average formula:

$$C_4H_9O(C_2H_4O)_{29.2}(C_3H_6O)_{22.3}CH_2CH=CH_2$$

(containing 0.9% of double bond) are dissolved in 50 g. of toluene to which has been added 0.5 g. of a 1% solution of chloroplatinic acid in isopropanol. The mixture is then heated at the reflux temperature of the toluene and the theoretical quantity, i.e. 2.9 g., of a tetrahydrogenopolysiloxane of the average formula:

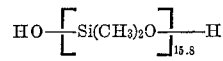

is added. The reaction is continued until no hydrogen atoms attached to silicon remain in the reaction mixture.

After working up as described in Example 1 filtration and elimination of the toluene), 25 g. of a slightly yellow, water-soluble oil having a viscosity of 980 centistokes at 20° C., are obtained.

EXAMPLE 3

Into a 250 cc. round-bottomed flask equipped as described in Example 1 are introduced 29 g. of a tetrahydrogenopolysiloxane of the average formula:

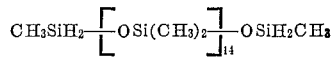

41 g. of a polyethylene-glycol diether of the average formula: CH$_2$=CH(OCH$_2$CH$_2$)$_{12}$OC$_4$H$_9$, 41 g. of anhydrous toluene, and 1.75 cc. of a solution of chloroplatinic acid in ispropanol containing 2.8 mg. of platinum. The mixture is heated under reflux for 8 hours, the temperature of the reaction mass varying between 115° and 120° C. It is then confirmed by titration that no Si—H groups remain, the toluene is eliminated by distillation in vacuo, and the reaction mixture is filtered hot. A clear yellow product having a viscosity of 1590 centistokes at 25° C. is obtained, $n_D^{20} = 1.4405$.

EXAMPLE 4

Into a 250 cc. round-bottomed flask are introduced: 48 g. of a polyethylene-glycol diether similar to that used in Example 3, 10 g. of a tetrahydrogenopolysiloxane of the average formula:

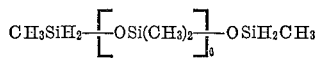

48 g. of anhydrous toluene, and 2 cc. of a solution of chloroplatinic acid in isopropanol containing 3,2 mg. of platinum. By proceeding as in Example 3, a yellowish-brown liquid having a viscosity of 295 centistokes at 25° C., and $n_D^{20} = 1.4549$, is obtained after heating under reflux for 8 hours.

EXAMPLE 5

Into a 250 cc. round bottomed flask are introduced: 51 g. of a polyethylenepolypropylene-glycol diether of the average formula:

$$C_4H_9(OCH_2CH_2)_{16}(OCH_2CH(CH_3))_{16}OCH_2CH=CH_2$$

50 g. of anhydrous toluene, and 1.60 cc. of a solution in toluene of a platinum-based catalyst prepared in accordance with Example 1 of French Pat. 1,367,044. The mixture is heated under reflux for 15 minutes and traces of water are removed azeotropically.

A mixture consisting of 12.5 g. of tetrahydrogenopolysiloxane similar to that used in Example 3 and 50 g. of anhydrous toluene is added to the contents of the flask in 2 hours, the addition taking place at the reflux temperature of the liquid in the flask.

When the addition is complete, heating at boiling point is maintained for 4 hours, 45 minutes. The Si—H groups have then disappeared. The toluene is driven off in vacuo by gradual heating to a temperature of 150° C. under a pressure of 4 mm. Hg. The residue is filtered hot, and 59.5 g. of a light yellow clear liquid having a viscosity of 4165 centistokes at 25° C., $n_D^{20} = 1.4502$, are obtained.

This liquid is employed in the preparation of a polyurethane foam by the following process. 38.3 g. of tolyene diisocyanate are incorporated with stirring into a mixture of 100 g. of a polypropylenetriol having a molecular weight of 3,500, 0.2 g. of triethylenediamine, 0.35 g. of stannous octoate, 3 g. of water, and 1 g. of the above-described polysiloxane. After the reaction, a multicellular product is obtained, having a fine, regular structure and a density of 29.4 g./l.

We claim:

1. An organosilicon compound having a viscosity between 500 and 5000 centistokes at 25° C. and of the formula:

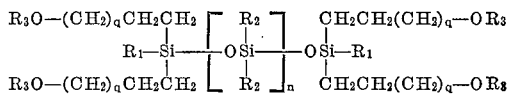

in which each of the radicals $R_1$ and $R_2$ is lower alkyl, cycloalkyl of 5 or 6 ring carbon atoms, phenyl, (lower alkyl)phenyl, or phenyl (lower alkyl), $n$ is an integer from 2 to 50, $q$ is an integer from 0 to 3, and each radical $R_3O—$ is of the formula:

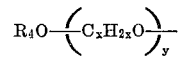

in which $R_4$ is lower alkyl, $x$ is 2, 3 or 4, and $y$ is a positive integer from 1 to about 69, the various radicals $(C_xH_{2x}O)$ being the same or different.

2. An organosilicon compound as claimed in claim 1 in which $R_2$ is methyl, $R_4$ is butyl, and the radical $C_xH_{2x}$ is —$CH_2CH_2$— or —$CH_2CH(CH_3)$—.

3. An organosilicon compound as claimed in claim 2 in which $R_1$ is methyl and $q$ is 1.

References Cited

UNITED STATES PATENTS 3,172,899  3/1965  Bailey _____ 260—448.2
3,402,192  9/1968  Haluska _____ 260—448.2

TOBIAS E. LEVOW, Primary Examiner

P. F. SHAVER, Assistant Examiner

U.S. Cl. X.R.

260—2.5, 46.5, 824, 825